(12) United States Patent
Ginossatis

(10) Patent No.: US 7,160,604 B2
(45) Date of Patent: Jan. 9, 2007

(54) LAMINATED HIGH BARRIER SHRINKABLE FILM

(75) Inventor: Dimitris Ginossatis, Koropi Attikis (GR)

(73) Assignee: Flexopack S.A., Koropi (GR)

( * ) Notice: Subject to any disclaimer, the term of this patent is extended or adjusted under 35 U.S.C. 154(b) by 0 days.

(21) Appl. No.: 11/131,936

(22) Filed: May 17, 2005

(65) Prior Publication Data

US 2005/0271877 A1   Dec. 8, 2005

(51) Int. Cl.
  B32B 7/02    (2006.01)
  B32B 27/08   (2006.01)
  B32B 27/30   (2006.01)
  B32B 27/32   (2006.01)
  B32B 27/34   (2006.01)

(52) U.S. Cl. .................... 428/212; 428/34.9; 428/35.7; 428/36.6; 428/36.7; 428/474.4; 428/474.7; 428/475.8; 428/476.3; 428/500; 428/515; 428/516; 428/518; 428/520; 428/522; 428/523; 428/910

(58) Field of Classification Search .................... None
See application file for complete search history.

(56) References Cited

U.S. PATENT DOCUMENTS

| | | |
|---|---|---|
| 4,133,924 A | 1/1979 | Seino et al. |
| 4,391,862 A | 7/1983 | Bornstein et al. |
| 4,797,235 A * | 1/1989 | Garland et al. ............. 264/471 |

FOREIGN PATENT DOCUMENTS

| | | |
|---|---|---|
| DE | 3528666 A1 | 2/1987 |
| EP | 1300238 A2 | 4/2003 |
| EP | 1300238 A3 | 4/2003 |
| WO | WO 03/016050 A | 2/2003 |

* cited by examiner

*Primary Examiner*—Vivian Chen
(74) *Attorney, Agent, or Firm*—Townsend and Townsend and Crew; M. Henry Heines

(57) ABSTRACT

The invention relates to laminated high oxygen barrier films for packaging applications and especially for shrinkable lidding applications. The multilayer heat shrinkable plastic film of the present invention comprises a laminate of at least two films 1 and 2, wherein film 1 has a hot glycerine shrinkage of more than 20% at 110° C. for 5 seconds and at least one of MD, TD directions; and film 2 has a hot glycerine shrinkage of less than 20% at 110° C. for 5 seconds in at least one of MD, TD directions.

25 Claims, No Drawings

LAMINATED HIGH BARRIER SHRINKABLE FILM

The invention relates to laminated high oxygen barrier film for packaging applications and especially for shrinkable lidding applications.

Thermoplastic films are being used to package various articles including perishable food products which require protection from the environment, resistance to physical and environmental abuse during storage and distribution, and an attractive appearance. Optical properties such as high gloss and low haze contribute to the aesthetic consumer appeal of products packed in such packaging materials. Abuse resistance properties are important to package integrity and are essential to the viability of the package product.

Oxygen barrier characteristics are required to provide extended shelf life for the packaged product in the case of food items, and various materials have been used to provide lower gas permeability and thereby reduce the oxygen transmission of the film. For example, ethylene vinyl alcohol copolymer (EVOH) and polyvinylidene chloride (PVDC) have been known as efficient oxygen barrier materials used in food packaging. Both have also been proved to be good barriers to odors or fragrances.

Commercial films used in the shrinkable lidding market are multilayer oriented films with the double bubble or tenter frame technology comprising oxygen barrier materials such as EVOH, PVDC or polyamide. These materials are often not easy to stretch and process leading to complicated and expensive machinery and the use of expensive materials as softeners by adding them to EVOH and PA.

A shrink feature may be imparted to a thermoplastic film by orientation of the film during its manufacture. This shrink feature allows the film to shrink or, if restrained, create shrink tension within the packaging film upon exposure to heat, for example in a hot water bath or by exposure to hot air. In a typical process, manufactured film is stretched in either the machine direction or perpendicular to machine direction, or both in varying degrees to impart a desired degree of shrinkability to the resulting film. Shrinkable film provides a tight, smooth appearance to a product wrapped in a such film, as well as some added toughness to protect the product from abuse.

Another important characteristic of the described film used for packaging is the strong seal force between the film and the bottom web or tray that forms the package. The term sealing refers to any means for closing the package, such as heat sealing, ultrasonic, impulse, RF, clipping etc.

A further important characteristic of the packaging film is to have an acceptable antifog performance. By this we mean the ability of the film to remain clear after packaging of foods that allow moisture diffusion resulting drop formation on the film. The antifog performance is generally achieved by adding antifog masterbatch or antifog coating to the film.

By shrinkable lidding film we mean a film which seals on a tray or bottom web film and also shrinks so that it creates a nice tight package. Shrinking may be generated before sealing, after sealing or simultaneously with the shrinking action.

SUMMARY OF THE INVENTION

The film of the invention solves the aforementioned difficulties by providing a multilayer heat shrinkable film comprising a laminate of at least two films 1 and 2, wherein film 1 has a glycerine shrinkage of more than 20% at 110° C. for 5 seconds in at least one of MD, TD directions and film 2 has a glycerine shrinkage of less than 20% at 110° C. for 5 seconds in at least one of MD, TD directions. Shrinkages are measured according to ASTM D 2732.

Preferably, the film of the present invention comprises a laminate of films 1 and 2, wherein film 1 has a shrinkage of more than 25%, preferably more than 30% at 110 C in at least one of MD, TD directions, and/or wherein film 2 has a shrinkage of less than 10%, preferably less than 5% at 110 C in at least one of MD, TD directions.

Furthermore, the shrinkage of the laminate in glycerine at 110° C. for 5 seconds is at least 20% in at least one of MD, TD directions.

The film provided in the present invention is formed by lamination preferably of a polyolefin based heat shrinkable oriented film to a multilayer oxygen barrier film wherein the shrinkability of preferably the first film is bigger in at least one of MD, TD directions compared to the second film. The shrinkability of the polyolefin film surprisingly controls the shrinkability of the laminate and the final article offers a good combination of the desired properties such as degree of shrinkage, puncture and abuse resistance, optical properties and antifog properties.

DEFINITIONS

As used herein, the term "polymer" refers to the product of a polymerization reaction and is inclusive of homopolymers, copolymers, terpolymers etc.

As used herein, the term "homopolymer" is used with reference to a polymer resulting from the polymerization of a single monomer.

As used herein the term "copolymer" refers to polymers formed by the polymerization reaction of at least two different monomers.

As used herein, the term "polypropylene" refers to any polymer comprising propynene polymerization units regardless of whether the polymer is a homopolymer or a copolymer and further includes blends of such homopolymers and copolymers.

As used herein the term "ethylene propylene copolymer" refers to polypropylene copolymerized with ethylene monomer.

As used herein the phrase "ethylene alpha-olefin copolymer" generally designates copolymers of ethylene with one or more comonomers selected from C3 to C20 alpha olefins such as 1-butene, 1-pentene, 1-hexene, 1-octene etc., in which the polymer molecules comprise long chains with relatively few side chain branches.

Ethylene/alpha-olefin copolymers generally have a density in the range of from about 0.86 $g/cm^3$ to about 0.94 $g/cm^3$. The term linear low density polyethylene (LLDPE) is generally understood to include the ethylene/alpha-olefin copolymers of about 0.915 to about 0.94 $g/cm^3$. Sometimes linear polyethylene in the density range of 0.926 to 0.940 is referred to as linear medium density polyethylene (LMDPE). Lower density ethylene/alpha-olefin copolymers may be referred as VLDPE or ULDPE (very low density polyethylene or ultra low density polyethylene).

The phrase "ethylene/alpha-olefin copolymer" also includes homogeneous polymers such as the metallocene catalysed EXACT® polymers obtainable from Exxon Mobil, TAFMER® polymers obtainable from Mitsui and long chain branched metallocene catalysed homogeneous polymers which are obtainable by DOW® as AFFINITY® resins. Also polymers like EXCEED® from Exxon Mobil and ELITE® from DOW® are included in ethylene/alpha-olefin copolymers.

As used herein "EVOH" refers to ethylene vinyl alcohol copolymer.

As used herein "PVDC" refers to vinylidene chloride homopolymers and copolymers.

As used herein, the term "polyamide" refers to high molecular weight polymers having amide linkages along the molecular chain and refers more specifically to synthetic polyamides such as nylons.

As used herein, the term "barrier" are used with reference to the ability of films to serve as barrier to oxygen or other gases.

As used herein, the term "oriented" refers to a polymer containing material which has been stretched at an elevated temperature, followed by being "set" in the stretched configuration by cooling the material while substantially retaining the stretched dimensions.

As used herein, the term "lamination", "laminate" and "laminated film" refer to the process and resulting product made by bonding together two or more layers of film or other materials. Lamination can be accomplished by joining layers with adhesives, joining with heat and pressure, and even spread coating and extrusion coating.

As used herein, the phrase "heat shrinkable", "heat shrink" and the like, refer to the tendency of a film, especially an oriented film to shrink upon the application of heat.

As used herein, the phrase "ethylene vinyl acetate" or EVA, is used to refer to a copolymer formed from ethylene and vinyl acetate monomers, wherein the ethylene derived units in the copolymer are present in major amounts, preferably between about 60 to about 98 percent, while the vinyl acetate derived units in the copolymer are present in minor amounts, preferably between about 2 and 40 percent.

As used herein, the phrase "ethylene methyl acrylate", or EMA, is used to refer used to refer to a copolymer formed from ethylene and methyl acrylate monomers, wherein the ethylene derived units in the copolymer are present in major amounts, preferably between about 60 to about 98 percent, while the methyl acrylate derived units in the copolymer are present in minor amounts, preferably between about 2 and 40 percent.

DETAILED DESCRIPTION

The present invention is a laminated film consisting of two films.

Film 1 is preferably produced by double bubble process or tenter frame process and its shrinkage in 110° C. along at least one of MD, TD is preferably more than 20%. Film 1 preferably comprises polyolefins, such as polyethylene homopolymers, copolymers, terpolymers, polypropylene homopolymers, polypropylene copolymers and terpolymers. In another preferred embodiment, film 1 comprises polyamide.

It is particularly preferred that the multilayer heat shrinkable film of the present invention comprises a laminate of film 1 and film 2 wherein film 1 comprises at least one material from polyethylene homopolymer, copolymer or terpolymer, polypropylene homopolymer, copolymer or terpolymer, PET, PBT, PETG and polyamide film 2 comprises at least one material from PVDC and EVOH.

Film 2 is preferably produced by conventional blown film method, shrinking at 110° C. preferably less than 20% with low shrinkforce in at least one of MD, TD. Film 2 incorporates high barrier material such as PVDC, EVOH or polyamide. In a preferred embodiment, PVDC is used.

Particularly preferred film 2 comprises an antifog additive or an antifog coating.

It has been surprisingly found that the shrinkage of the laminated film is controlled by film 1, so that the laminated film has a bigger shrinkage than film 2. It has also been confirmed that by selecting proper thicknesses of films 1 and 2, we may select the desired level of shrinkability and shrink force.

The amount of shrinkage and its force at 110° C. is measured by dipping an article of 10 cm width and 10 cm length in glycerine bath for 5 seconds, according to ASTM D 2732.

In a preferred embodiment, film 1 may be of the structure PE/PP/PE, where PE can be low density polyethylene or ethylene a-olefin copolymer. PP may be polypropylene homopolymer, copolymer or terpolymer. In another embodiment, film 1 may be shrinkable polyamide, PET, PBT, PETG or other combinations of polyester copolymers.

In a preferred embodiment, film 2 may comprise ethylene a olefin copolymers, low density polyethylene, EVAs, EMAs, tie layers, EVOH, PVDC or polyamide.

Both films 1 and 2 may also contain additives such as slip agents, antiblock agents, antifog agents, UV quenchers etc. generally known to persons skilled in the art.

Preferably the laminate or the films of which it consists are irradiated.

Film 2 comprises preferably a lamination layer, several adjacent layers and a sealing layer. In one non limiting embodiment of the present invention the number of layers of each film 1 and 2 is one to nine layers. Proper selection of the number of layers depends on the kind of use and can be properly selected by a person skilled in the art. The oxygen barrier material provides preferably an oxygen transmission rate through the entire multilayer film below about 20 $cm^3/1$ $m^2$/24 hrs/atm. In a preferred embodiment of the invention, the oxygen barrier layer comprises polyamides (e.g. Nylon®), a hydrolyzed ethylene vinyl acetate copolymer (EVOH) or a vinylidene copolymer, preferably vinylidene chloride-vinyl chloride copolymer (VC copolymer) or vinylidene chloride-methyl acrylate copolymer (MA copolymer). Preferably the oxygen barrier layer thickness is between about 1 μm and about 13 μm.

In the above described heat shrinkable multilayer film production process, film 1 or 2 or the laminate of 1 and 2 may be exposed to atomic radiation. By the exposure to atomic radiation the final product may be provided with improved heat resistance and mechanical strength. In the present invention, known actinic radiation such as a rays, β rays, γ rays, electron rays or X rays may be used. In order to provide an adequate level of crosslinking effect, electron rays and γ rays are preferred. Electron rays are particularly preferred and the radiation dose may be in the range of 1 to 20 MRAD.

EXAMPLE 1

One preferred structure comprises the following two films.

Film 1. Polyolefin based heat shrinkable film, manufactured with double bubble process, thickness 19 μm. Commercial name is Clarus® 700 and is produced by GEFO FOLIEN.

Film 2. Nine layer oxygen barrier film with thickness 22 microns.

Films were laminated in a solventless lamination unit using commercial adhesives.

Structure of Film 2.
Lamination layer 80% PE1+19% PE2+1% antiblock/slip additives, thickness 5 microns
Adjacent layer 70% PE1+30% PE2, thickness 1 micron
Adjacent layer E1, thickness 2 microns
Adjacent layer 70% M1+30% M2, thickness 1 micron
Adjacent layer PVDC 2 microns
Adjacent layer 70% M1+30% M2, thickness 1 micron
Adjacent layer 90% E1+10% AF1, thickness 2 microns
Adjacent layer 70% PE1+18% AF1+12% PE2, 2 microns
Sealing layer 70% PE1+20% AF1+10% PE2, 5 microns The abbreviations are explained in detail in Table 1.

EXAMPLE 2

Film 1. Polyolefin based heat shrinkable film, manufactured with double bubble process, thickness 19 microns. Commercial name is Clarus® 110 GG and is produced by GEFO FOLIEN.

Film 2. Nine layer oxygen barrier film with thickness 22 microns, same as example 1.

Films were laminated in a solventless lamination unit using commercial adhesives.

Shrinkage and Optics Comparisons

The shrinkage of films 1 and 2 is compared to two competition films as follows. Specimens with length 10 cm and width 10 cm along the MD and TD direction are immersed in glycerine bath at 110° C. for 5 seconds. This test has been used by the applicant for a good simulation of shrinkage in real cases of shrinking lidding films. Measurement is according to ASTM D 2732.

The optical properties are tested according to ASTM D1003 (haze) and BS2782 (gloss).

The two competition films are oriented, heat shrinkable, coextruded films comprising polyamide and EVOH.

|  | MD SHRINKAGE (110 C., 5 SEC) | TD SHRINKAGE (110 C., 5 SEC) | HAZE | GLOSS |
|---|---|---|---|---|
| COMPETITION 1 | 20 | 25 | 14 | 72 |
| COMPETITION 2 | 29 | 31 | 14.5 | 70 |
| EXAMPLE 1 | 32 | 28 | 13 | 75 |
| EXAMPLE 2 | 40 | 42 | 10.5 | 80 |

The shrinkage was also measured at 130 C for 10 seconds in glycerine bath as described above. This simulates the use of the product in higher oven temperatures.

|  | MD SHRINKAGE (130 C., 1 SEC) | TD SHRINKAGE (130 C., 10 SEC) |
|---|---|---|
| COMPETITION 1 | 25 | 30 |
| COMPETITION 2 | 22 | 45 |
| EXAMPLE 1 | 75 | 52 |
| EXAMPLE 2 | 80 | 75 |

Thus it is obvious that by the present invention can be obtained higher shrinkage values than state of the art.

Seal Strength Comparisons.

Seal strength was compared between example 1 of the present invention and the two competition examples. The seal strength tests were done in a Toss machine, 1 sec heating time, 0.5 sec cooling time, 2 bar pressure and temperatures as follows.

The sealing was done from side of film 2 to side of film 2 in the case of example 1. In the two comparison samples it was done as "sealing layer to sealing layer".

The sealing strength was measured in kg/15 mm.

| Temp | Comp 1 | Comp 2 | Example 1 |
|---|---|---|---|
| 120 | 2.1 | 0.7 | 2:4 |
| 130 | 2.9 | 0.8 | 2.9 |
| 140 | 3.2 | 1.0 | 3.1 |

Abbreviations of the two examples are explained as follows in table 1

TABLE 1

| ABBR. | RESIN | COMPANY | TYPE | DENSITY |
|---|---|---|---|---|
| PE1 | 18PFAX | BASELL | METALLOCENE LLDPE | 0.918 |
| PE2 | 1020FN24 | ATOFINA | LDPE | 0.924 |
| E1 | ELVAX 3190 | DUPONT | EVA | 0.94 |
| M1 | 29MAO3 | ATOFINA | EMA | 0.95 |
| M2 | 24MAO5 | ATOFINA | EMA | 0.94 |
| AF1 | 0202LD | CONSTAB | ANTIFOG |  |

The invention claimed is:

1. A multilayer heat shrinkable plastic film comprising a laminate of at least two films 1 and 2, wherein
   film 1 has a hot glycerine shrinkage of more than 20% at 110° C. for 5 seconds in at least one of MD, TD directions; and
   film 2 has a hot glycerine shrinkage of less than 20% at 110° C. for 5 seconds in at least one of MD, TD directions; and
   wherein film 1 comprises a member selected from the group consisting of a polyolefin, a polyamide, and a combination of a polyolefin and a polyamide.

2. The film of claim 1 wherein film 1 has a shrinkage of more than 25% at 110° C. for 5 seconds in at least one of MD, TD directions.

3. The film of claim 1 wherein at least one of films 1 and 2 comprises an oxygen barrier material.

4. The film of claim 3 wherein the oxygen barrier material provides an oxygen transmission rate through the entire multilayer film that is below about 20 cm$^3$/1 m$^2$/24 hrs/atm.

5. The film of claim 3 wherein the oxygen barrier layer comprises a member selected from the group consisting of a polyamide, a hydrolyzed ethylene vinyl acetate copolymer (EVOH), and a vinylidene copolymer.

6. Film according to claim 5 wherein said vinylidene copolymer is a member selected from the group consisting of vinylidene chloride-vinyl chloride copolymer (PVDC) and vinylidene chloride-methyl acrylate copolymer (MAVDC).

7. The film of claim 3 wherein the oxygen barrier material has a thickness of from about 1 μm to about 13 μm.

8. The film of claim 1 wherein film 2 comprises a lamination layer, a plurality of adjacent layers and a sealing layer.

9. The film of claim 1 wherein film 1 comprises a member selected from the group consisting of a polyethylene homopolymer, a polyethylene copolymer, a polyethylene terpolymer, a polypropylene homopolymer, a polypropylene copolymer, a polypropylene terpolymer, and a PE/PP/PE layer, and a combination of two or more of the above.

10. The film of claim 1 wherein film 2 comprises layers of a member selected from the group consisting of an ethylene-alpha olefin copolymer, LDPE, EVA, EMA, EVOH, PVDC and a tie layer.

11. The film of claim 1 wherein said plastic film further comprises a film additive selected from the group consisting of a slip agent, an antiblocking agent, a colorant, an odor inhibitor, an oxygen inhibitor, an antifog additive, and an antifog coating.

12. The film of claim 1 wherein
film 1 comprises a member selected from the group consisting of a polyethylene homopolymer, a polyethylene copolymer, a polyethylene terpolymer, a polypropylene homopolymer, a polypropylene copolymer, and a polypropylene terpolymer, and
film 2 comprises a member selected from the group consisting of PVDC and EVOH.

13. The film of claim 1 wherein the film is irradiated.

14. The film of claim 1 wherein film 2 comprises an antifog additive or an antifog coating.

15. The film of claim 1, wherein said laminate has a shrinkage in glycerine at 110° C. for 5 seconds of at least 20% in at least one of MD, TD directions.

16. The film of claim 1 wherein film 1 is produced by a double bubble process or tenter frame process.

17. A method for producing a film in accordance with claim 1 comprising separately producing films 1 and 2 and sealing or laminating together films 1 and 2 so produced.

18. The film of claim 1 wherein film 1 has a shrinkage of more than 30% at 110° C. for 5 seconds in at least one of MD, TD directions.

19. A multilayer film according to claim 1 wherein film 2 has a shrinkage of less than 10% at 110° C. for 5 seconds in at least one of MD, TD directions.

20. A multilayer film according to claim 1 wherein film 2 has a shrinkage of less than 5% at 110° C. for 5 seconds in at least one of MD, TD directions.

21. A multilayer film according to claim 1 wherein film 1 has a shrinkage of more than 25% at 110° C. for 5 seconds in at least one of MD, TD directions, and film 2 has a shrinkage of less than 10% at 110° C. for 5 seconds in at least one of MD, TD directions.

22. A multilayer film according to claim 1 wherein film 1 has a shrinkage of more than 30% at 110° C. for 5 seconds in at least one of MD, TD directions, and film 2 has a shrinkage of less than 5% at 110° C. for 5 seconds in at least one of MD, TD directions.

23. Film according to claim 1 wherein film 2 comprises an oxygen barrier material.

24. The film of claim 1 wherein film 2 is produced by a blown film process.

25. The film of claim 1 wherein film 1 is produced by a double bubble process or tenter frame process and film 2 is produced by a blown film process.

* * * * *